United States Patent
Ono

[19]

[11] Patent Number: 5,939,116
[45] Date of Patent: Aug. 17, 1999

[54] METHOD FOR FAR-INFRARED DRYING OF FOOD UNDER REDUCED PRESSURE AT LOW TEMPERATURE

[75] Inventor: Takuji Ono, Okayama, Japan

[73] Assignee: Ono Foods Industrial Co., Ltd., Okayama, Japan

[21] Appl. No.: 09/051,087

[22] PCT Filed: Oct. 11, 1996

[86] PCT No.: PCT/JP96/02953

§ 371 Date: Apr. 13, 1998

§ 102(e) Date: Apr. 13, 1998

[87] PCT Pub. No.: WO97/13417

PCT Pub. Date: Apr. 17, 1997

[30] Foreign Application Priority Data

Oct. 12, 1995 [JP] Japan ................................. 7-289175

[51] Int. Cl.[6] ................................. A23B 4/00; F26B 3/00
[52] U.S. Cl. ................................. 426/242; 34/266; 34/267; 426/468
[58] Field of Search ................................. 426/242, 465, 426/468; 34/266, 267

[56] References Cited

U.S. PATENT DOCUMENTS 4,612,200  9/1986  Sato ........................................ 426/242
4,860,461  8/1989  Tamaki et al. ............................ 34/267

FOREIGN PATENT DOCUMENTS 57-194696  12/1982  Japan .
60-89671   5/1985   Japan .
60-120973  6/1985   Japan .
63-39568   2/1988   Japan .
63-201493  12/1988  Japan .
63-301780  12/1988  Japan .
1-247072   10/1989  Japan .
1-304841   12/1989  Japan .

*Primary Examiner*—George Yeung
*Attorney, Agent, or Firm*—Jones, Tullar & Cooper, P.C.

[57] ABSTRACT

The invention relates to a method of sterilizing and dewatering food in a shortened length of time, still permitting the processed food to remain an elongated length of time in good taste. The inner pressure of an insulated dryer is raised by feeding nitrogen gas after evacuating the insulating dryer, and at the same time, pieces of food are exposed to an ethanol spray, so that the oxygen gas remaining in the tissue of the food may be replaced by nitrogen gas to prevent oxidization of the food. At the same time, ethanol penetrates the food well for sterilization. Next, the inner pressure of the insulating dryer is reduced by removing nitrogen gas therefrom, and the pieces of food are exposed to the far-infrared radiation to be heated, thus preventing evaporation of water from the pieces of food to prevent their temperature from being lowered, and expediting removal of water in the surrounding low-pressure atmosphere to provide semi-dried products. The sterilization-and-water removal has the effect of extending the preservation period of dried food. Also advantageously, the dewatering of food at a low temperature has the effect of substantially preventing the discoloring and deteriorating of the dried food, permitting long-lasting good taste.

1 Claim, 3 Drawing Sheets

METHOD FOR FAR-INFRARED DRYING OF FOOD UNDER REDUCED PRESSURE AT LOW TEMPERATURE

FIELD OF THE INVENTION

The present invention relates to a system for far-infrared drying food at reduced pressure and temperature.

BACKGROUND OF THE INVENTION

One method of preserving seafood for a relatively short period is natural drying, which is called "Overnight Drying". Fresh fishes are cut open to remove inner organs, and what remaines is rinsed from the opened fishes. The opened fishes are put on bamboo lattices to be dried all day and all night long. The "Overnight Drying" will put opened fishes in a semi-dried condition, and the so semi-dried products can be preserved for a relatively short period.

Such a natural drying method can be used in weather-permitting districts in limited seasons, and it requires a relatively large outdoor space for opened fishes to be set in order a and a lot of manpower is needed in drying.

In addition, there is a sanitary problem of contamination with dust and bacilli floating in the air, and there is a fear of deteriorating the taste of dried products due to oxidization. Usually it takes the whole day (24 hours) to dry opened fishes, and the opened fishes must be brought in houses when the weather is threatening. Therefore, a natural drying is a time-consuming and laborious work.

Alternatively indoor drying can be effected in sanitary rooms by using infrared lamps in place of sunlight. Such infrared heating will dry the surface of opened fishes and other foods in to a crisp condition, thereby confining free water inside to allow bacilli to breed. Otherwise, the oxygen gas remaining in the tissue of the food causes the surface of dried foods to detiorate due to oxidation.

Another drying method uses cold wind. Advantageously it takes 3 to 4 hours to dry foods in such a semi-dried condition as attained by the "Overnight Drying". The so dried products, however, are abundant in bacilli, and cannot be preserved for a long period without recourse to freezing preservation.

SUMMARY OF THE INVENTION

In an attempt to solve the problems described above, one object of the present invention is to provide a method of semi-drying a lot of food in a sanitary circumference in a relatively short period irrespective of weather and seasons. Another object of the present invention is to provide a food-drying system for semi-drying foods to provide bacilli-free semi-dried foods whose surface is not crisp, retaining good freshness and deliciousness.

According to the present invention, a method for far-infrared drying foods contained in an air-tight, insulating dryer comprises the steps of:

(1) drawing the air from the insulating dryer by a vacuum pump to reduce the inner pressure to 560 mmHg to 160 mmHg in 1 to 10 minutes;

(2) feeding nitrogen gas containing ethanol to the insulating dryer for spraying the ethanol onto the foods, and raising the inner pressure to 1.0 kg/cm$^2$G to 1.9 kg/cm$^2$G in 1 to 10 minutes to keep the so raised pressure for 1 to 10 minutes;

(3) reducing the inner pressure below 160 mmHg to 1 mmHg by a vacuum pump within 30 minutes after stopping the feeding of the nitrogen gas containing ethanol to the insulating dryer;

(4) supplying the far-infrared heater with electricity to heat the foods while keeping the inner pressure below 160 mmHg to 1 mmHg, thereby keeping the core temperature of the foods at 0° C. to 10° C. for 15 to 90 minutes; and (5) supplying the insulating dryer with air until the inner pressure has reached atmospheric pressure.

DESCRIPTION OF THE PREFERRED EMBODIMENT

A preferred embodiment of the present invention is described below with reference to the accompanying drawings.

Figure 1:
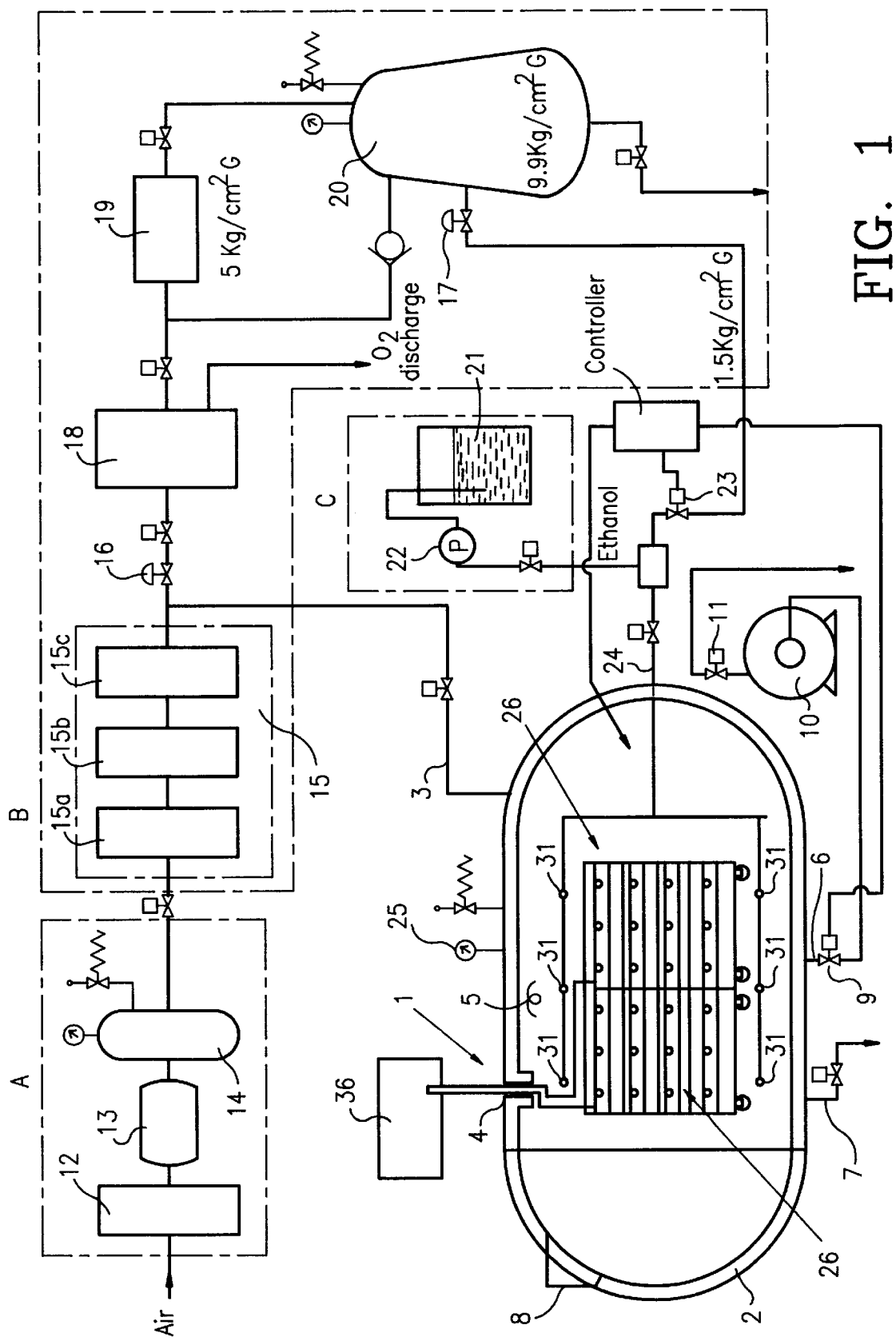
FIG. 1 shows a general arrangement of a low-pressure, low-temperature, far-infrared drying system according to the present invention.

Referring to FIG. 1, a low-pressure, low-temperature, far-infrared drying system according to the present invention comprises an air-tight, insulating dryer 1 having an air-feeding conduit 3 passing through its outer surrounding wall for supplying clean air to the inner space of the insulating dryer 1 through an associated filter, an inactive gas (nitrogen gas) feeding conduit 24 passing through its outer surrounding wall for supplying nitrogen gas to the inner space, an evacuating conduit 6 for drawing air from the inner space, a cable outlet 4 for pulling out electric wires and signal lines from the inner space, and illumination equipment 5 for lighting the inner space.

The insulating dryer 1 has an air-tight door 2 and a monitoring glass window 8 provided on its front.

The evacuating conduit 6 is connected to the drawing side of a vacuum pump 10 via a control valve 9, and the draining side 11 of the vacuum pump 10 is open to the atmosphere.

A dry-air producing apparatus A, a nitrogen producing apparatus B and an ethanol spraying apparatus C are connected to the insulating dryer 1.

The dry-air producing apparatus A comprises a dryer 12, a compressor 13 and an air tank 14. Air is made to pass to the compressor 13 through the dryer 12 to store the dry air at a high pressure in the air tank 14.

The nitrogen producing apparatus B comprises a series-connection of a minute-particle filter 15a, a main filter 15b and an activated carbon filter 15c, a pressure reducing valve 16, a nitrogen gas producing unit 18, a pressure increasing unit 19 and a nitrogen gas tank 20. The dry air is made to flow from the air tank 14 to the pressure reducing valve 16 through the series-connection of filters 15.

Then, the air at a reduced pressure is supplied to the nitrogen gas producing unit 18 where the dry air is separated into oxygen gas and nitrogen gas according to the adsorption method (PSA method) using membrane modules or molecular sieves, and the oxygen gas is removed to leave nitrogen gas, the pressure of which nitrogen gas is raised by the pressure increasing unit 19 for storing in the nitrogen gas tank 20.

The ethanol spraying apparatus C comprises an ethanol tank 21 and a spraying pump 22. These get in the route from the nitrogen gas tank 20 to the dryer 1. Ethanol is drawn from the ethanol tank 21 by the spraying pump 22 to be added to the nitrogen gas. Thus, the nitrogen gas containing ethanol mist is ejected from the spraying nozzle 31 to the inner space of the insulating dryer 1.

Nitrogen gas is made to flow from the nitrogen tank 20 to the insulating dryer 1 through the pressure reducing valve 17 and the control valve 23, and the nitrogen gas containing ethanol mist is ejected from the nitrogen gas feeding conduit 24 into the inner space of the insulating dryer 1.

The inner pressure of the insulating dryer 1 is detected by a pressure senser 25, and the nitrogen gas feeding control valve 23 and the evacuating control valve 9 of the vacuum pump 10 are responsive to the signal from the pressure senser 25 for controlling the inner pressure.

Figure 2:
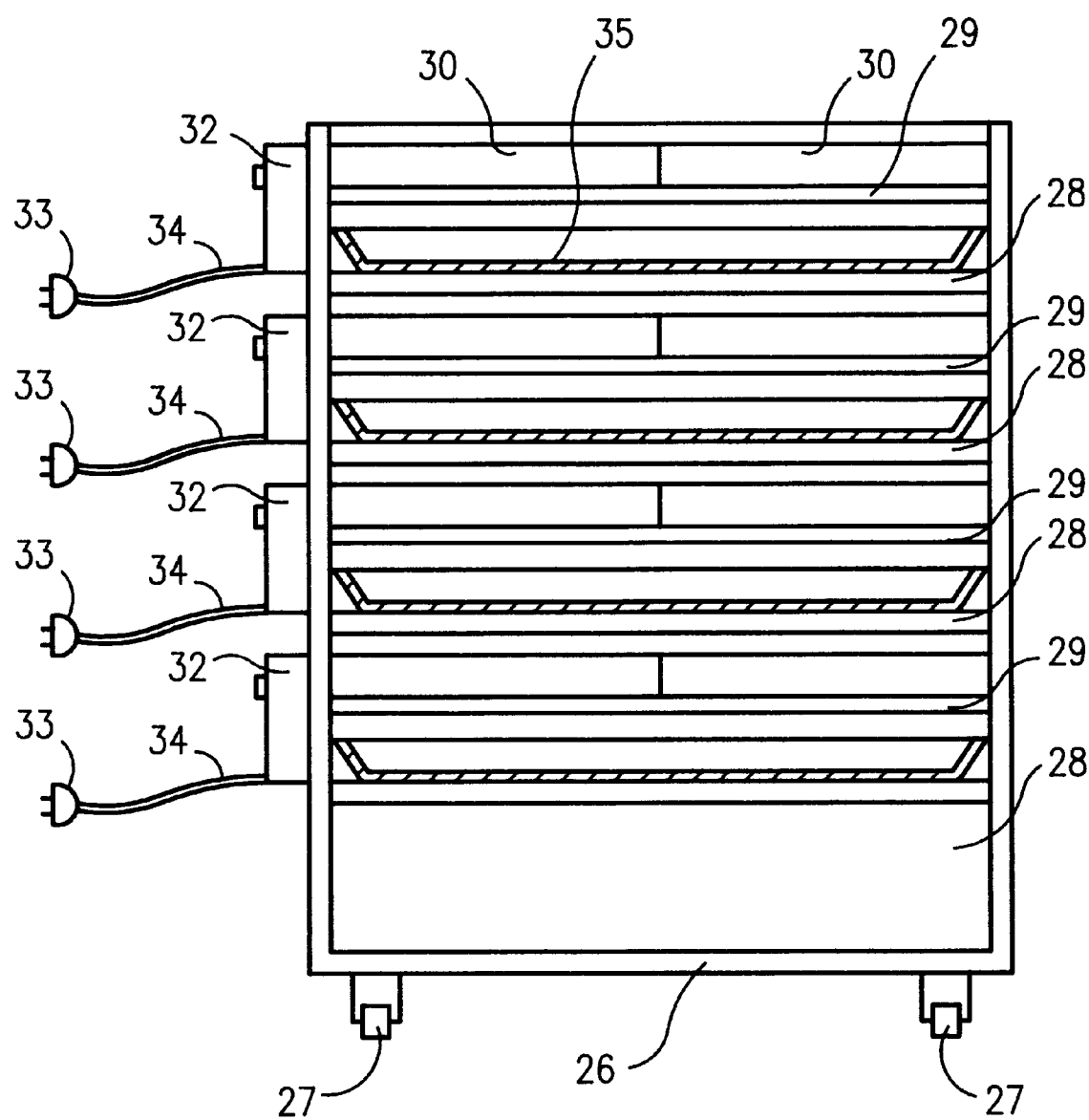
FIG. 2 is a front view of a tray cart to be used in the drying system of FIG. 1.
Figure 3:
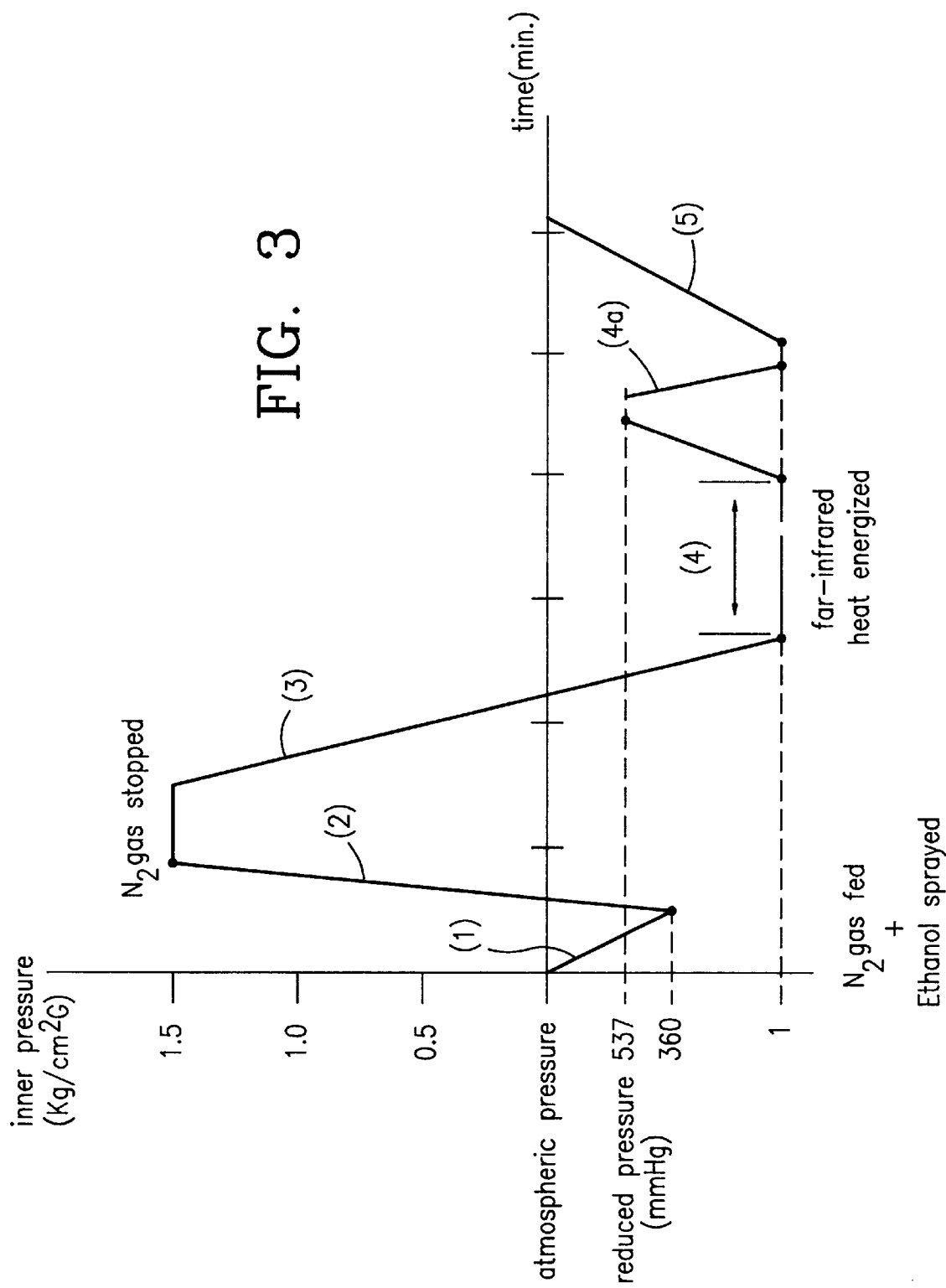
FIG. 3 shows how the inner pressure of the insulating dryer of FIG. 1 varies with time.

Referring to FIG. 2. a tray cart 26 has wheels 27. It has four shelves 28 laid between its longitudinal posts, and a plurality of rod-like far-infrared heaters 30 are arranged on a lateral frame above each shelf 28. Temperature controls 32 are used to control the temperature of the far-infrared heaters 30.

Trays 35 have stainless steel nets stretched thereacross. Pieces of food are arranged on the trays 35, and then, the trays 35 are put on the shelves 28.

In case of fishes their heads and inner organs are removed, and the remains are rinsed away with water.

The far-infrared heaters 30 are connected to associated temperature controls 32, and the electric power cables 34 are pulled out of the insulating dryer 1, extending from these temperature controls 32, and the water-tight plugs 33 are inserted in the outlets of the power supply 36.

The operation of the far-infrared insulating dryer includes the following steps:

(1) Evacuating process

The evacuation control valve 9 is opened, and the vacuum pump 10 is driven to draw the air from the inner space of the insulating dryer 1 so that the inner pressure may be reduced to about 200 mmHg in 1 to 10 minutes.

In this condition pieces of food are dewatered both from their surfaces and tissues to purge moisture along with the air to the atomosphere through the evacuation conduit 6.

The surrounding atmosphere at reduced pressure permits removal of air from the tissue of food without deteriorating the qualities of food within an economically advantageous short length of processing time, improving penetration of ethanol into the pieces of food in the subsequent ethanol spraying step.

The length of time involved for evacuation depends on the capacity of the vacuum pump 10, and can be shortened by using a vacuum pump of increased capacity. It, however, need not be shortened below 1 minute.

However, the whole efficiency will be significantly reduced if the length of time involved for evacuation is ten or more minutes long.

(2) Supplying nitrogen gas and raising its pressure

The evacuation control valve 9 is closed, and the feeding control valve 23 is opened to supply the insulating dryer 1 with nitrogen gas. In the course of raising the inner pressure up to atmospheric pressure, ethanol is sprayed into the nitrogen gas by the spraying pump 22. The ethanol mist (particles of 10 to 15 microns in diameter) is produced from the spraying nozzle 31.

Within the period of 0.5 (30 seconds) to 10 minutes subsequent to the outset of the feeding of nitrogen gas the inner pressure is raised to 1.0 kg/cm$^2$G to 1.9 kg/cm$^2$G, and the so raised inner pressure is allowed to continue 1 to 5 minutes. Preferably the purity of the sprayed ethanol is 75% or more.

The air is replaced by nitrogen gas in the insulating dryer 1, and the oxygen gas is replaced by nitrogen gas in the tissue of foods, too.

At the same time, the ethanol mist contained in the nitrogen gas sterilizes bacilli if any, on the pieces of food.

Nitrogen gas is effective to prevent not only the oxidization of food, but also the explosion which otherwise, could be caused by filling the insulating dryer with the inflammable ethanol mist.

(3) Removing nitrogen gas and lowering the inner pressure

While the feeding control valve 23 is closed to stop the feeding of nitrogen gas, the evacuation control valve 9 is opened to draw the nitrogen gas from the inner space of the insulating dryer 1 by the vacuum pump 10 so that the inner pressure is reduced to 160 mmHg to 1 mmHg (almost vaccum condition) in 30 or less minutes.

The processing length of time depends on the capacity of the vacuum pump, but a shortened length of time involved for the processing is desirable from the stand point of keeping the freshness of the food.

If the inner pressure is raised above 160 mmHg, the water content of the food will be evaporated depriving the pieces of food of their heat so that they may freeze unless heated at a subsequent step.

(4) Supplying the far-infrared heaters with electricity while the inner space remains at a reduced pressure While the inner pressure is kept at 160 mmHg to 1 mmHg, the far-infrared heaters 30 are supplied with electricity to expose the pieces of food to far-infrared radiation. The temperature control 32 is responsive to the surrounding temperature of the far-infrared heaters 30 for controlling the quantity of electricity, thereby keeping the core temperature of the food at 0° C. to 10° C. for 15 to 90 minutes.

The core temperature of the food is determined in terms of the temperature surrounding pieces of the food. The core temperature of food is kept in the range from 0° C. to 10° C. by far-infrared radiation to expedite the vaporizing of the water content of food. Thus, the pieces of food are dewatered at an increased efficiency.

The temperature of food starts rising as the water vaporization is getting close to the end, and then, the far-infrared heaters 30 are automatically disconnected from the power supply to allow the subsequent processing to start.

(4a) Reducing the inner pressure after supplying the insulating dryer with nitrogen gas again The evacuation control valve 9 is closed, and the feeding control valve 23 is opened, thereby permitting ejection of nitrogen gas into the insulating dryer until the inner pressure has reached 460 mmHg to 710 mmHg, and then, the feeding of nitrogen gas is stopped. The prevailing atmosphere is allowed to continue at least 2 or 3 seconds and at longest 5 minutes, and then nitrogen gas is removed from the inner space until the inner pressure is reduced to 160 mmHg to 1 mmHg. Thus, the oxygen gas remaining in the tissue of food is replaced by nitrogen gas.

The length of time involved for replacing of oxygen gas by nitrogen gas depends on the surface condition of the food and the size of each piece of food. This processing can be omitted for particular kinds of food such as opened horse mackerels. Then, the processing can be shifted from the step (4) directly to the following step (5).

(5) Returning to the atmospheric pressure

Clean air is injected into the insulating dryer 1 through the series-connection of filters 15 to raise the inner pressure of the insulating dryer 1 to atmospheric pressure, and then, the tray cart 26 is pulled out of the insulating dryer 1. The pieces of food are wrapped with gas-barrier film. Preferably the wrappings are filled with nitrogen gas, carbon dioxide or a nitrogen gas-and-carbon dioxide mixture to prevent the wrapped food products from being oxidized or spoiled.

As may be perceived, the steps (3) to (5) are dewatering steps, and fishes and other foods are dried at a reduced pressure and temperature.

-a- time involved for each step in case of opened horse mackerels:

| | |
|---|---|
| (1) evacuation | 1 min. |
| (2) nitrogen gas fed to raise the inner pressure | 3 min. 30 secs. |
| (3) nitrogen gas removed to reduce the inner presure | 3 min. |
| (4) supplying heaters with electricity in low-pressure atmosphere | 50 min. |
| (5) returning to the atmospheric pressure | 5 secs. |

The total length of time amounts to about 58 minutes.

If the step (4a) is not omitted, additional length of time is 10 seconds.

The particulars of the insulating dryer and associated devices are as follows:

| | |
|---|---|
| the capacity of the insulating dryer | 2.6 m³ |
| the number of trays (5 steps, 2 columns; 450 pieces of opened fishes) | 10 |
| the capacity of the vaccum pump | 7.4 KW |
| the capacity of the compressor | 5.9 KW |
| the capacity of the heater | 12 KW |
| the yield of nitrogen gas | 8.1 m³/h |
| the capacity of the nitrogen tank | 2 m³ |
| the capacity of ethanol tank | 20 liters |

The weight ratio of the post-dried, opened horse mackerel to the pre-dried, opened horse mackerel is 85%, and the dried products can be preserved one month at the temperature of 5° C. As for natural-dried products it will take 16 to 24 hours to dry pieces of opened horse mackerel until the weight ratio has reached 85%, and the natural-dried products can be preserved only a few days at the temperature of 5° C.

Time involved for each processing step in drying other different foods is as follows:

-b- Chinese noodles, Japanese noodles and pasta

| | |
|---|---|
| (1) evacuation | 1 min. |
| (2) nitrogen gas fed to raise the inner pressure | 3 min. 30 secs. |
| (3) nitrogen gas removed to reduce the inner presure | 3 min. |
| (4) supplying the heaters with electricity in low-pressure atmosphere | 20 min. |
| (5) returning to the atmospheric pressure | 5 secs. |

The total length of time amounts to 27 minutes and 35 seconds.

-c- Ground fish meat (deep-fried kamaboko and kamaboko)

| | |
|---|---|
| (1) evacuation | 1 min. |
| (2) nitrogen gas fed to raise the inner pressure | 3 min. 30 secs. |
| (3) nitrogen gas removed to reduce the inner presure | 3 min. |
| (4) supplying the heaters with electricity in low-pressure atmosphere | 10 min. |
| (5) returning to atmospheric pressure | 5 secs. |

The total length of time amounts to 17 minutes and 35 seconds.

-d- Sweet-sake seasoned-and-dried fishes (horse mackerel and sea bream)

| | |
|---|---|
| (1) evacuation | 1 min. |
| (2) nitrogen gas fed to raise the inner pressure | 3 min. 30 secs. |
| (3) nitrogen gas removed to reduce the inner presure | 3 min. |
| (4) supplying the heaters with electricity in low-pressure atmosphere | 90 min. |
| (5) returning to the atmospheric pressure | 5 secs. |

The total length of time amounts to 97 minutes and 35 seconds.

-e- Korean pickles and vegetables lightly preserved in salt or rice bran

| | |
|---|---|
| (1) evacuation | 1 min. |
| (2) nitrogen gas fed to raise the inner pressure | 3 min. 30 secs. |
| (3) nitrogen gas removed to reduce the inner presure | 3 min. |
| (4) supplying the heaters with electricity in low-pressure atmosphere | 15 min. |
| (5) returning to atmospheric pressure | 5 secs. |

The total length of time amounts to 22 minutes and 35 seconds.

-f- Fried food (tenpura, deep-fried chicken, breaded and deep-fried cutlet, roast fish)

| | |
|---|---|
| (1) evacuation | 1 min. |
| (2) nitrogen gas fed to raise the inner pressure | 3 min. 30 secs. |
| (3) nitrogen gas removed to reduce the inner presure | 3 min. |
| (4) supplying the heaters with electricity in low-pressure atmosphere | 30 min. |
| (5) returning to atmospheric pressure | 5 secs. |

The total length of time amounts to 37 minutes and 35 seconds.

-g- Meat (hamburg steak, hashed beef and beefsteak)

| | |
|---|---|
| (1) evacuation | 1 min. |
| (2) nitrogen gas fed to raise the inner pressure | 3 min. 30 secs. |
| (3) nitrogen gas removed to reduce the inner presure | 3 min. |
| (4) supplying the heaters with electricity in low-pressure atmosphere | 30 min. |
| (5) returning to atmospheric pressure | 5 secs. |

The total length of time amounts to 37 minutes and 35 seconds.

-h- Household dishes (potato salada, chilled food)

| | |
|---|---|
| (1) evacuation | 1 min. |
| (2) nitrogen gas fed to raise the inner pressure | 3 min. 30 secs. |
| (3) nitrogen gas removed to reduce the inner presure | 3 min. |
| (4) supplying the heaters with electricity in low-pressure atmosphere | 60 min. |
| (5) returning to atmospheric pressure | 5 secs. |

The total length of time amounts to 67 minutes and 35 seconds.

-i- Uncured ham

| | |
|---|---|
| (1) evacuation | 1 min. |
| (2) nitrogen gas fed to raise the inner pressure | 3 min. 30 secs. |
| (3) nitrogen gas removed to reduce the inner presure | 3 min. |
| (4) supplying the heaters with electricity in low-pressure atmosphere | 100 min. |
| (5) returning to atmospheric pressure | 5 secs. |

The total length of time amounts to 100 hours 7 min. and 35 seconds.

-j- Dried cuttlefish

| | |
|---|---|
| (1) evacuation | 1 min. |
| (2) nitrogen gas fed to raise the inner pressure | 3 min. 30 secs. |
| (3) nitrogen gas removed to reduce the inner presure | 3 min. |
| (4) supplying the heaters with electricity in low-pressure atmosphere | 80 min. |
| (5) returning to atmospheric pressure | 5 secs. |

The total length of time amounts to 87 min. and 35 seconds.

In this particular embodiment each far-infrared heater 30 is equipped with a temperature control 32 for exclusive use, and therefore, the far-infrared heaters 30 of the empty trays can be prevented from being supplied with electricity, and electric power can be controlled appropriately for the positions and sizes of pieces of food laid on trays, thereby economizing on electric power.

Advantageously ultraviolet lamps may be attached to the ceiling of the insulating dryer to permit pieces of food to be exposed to ultraviolet rays for effectively suppressing the breeding of bacilli.

As may be understood from the above, the inner pressure of the insulated dryer is raised by feeding nitrogen gas after evacuating the insulating dryer, and at the same time, pieces of food are exposed to the spray of ethanol, so that the oxygen gas remaining in the tissues of the food may be replaced by nitrogen gas to prevent oxidization of food, and at the same time, ethanol penetrates the food well for sterilization.

Next, the inner pressure of the insulating dryer is reduced by removing nitrogen gas from the insulating dryer, and the pieces of food are exposed to the far-infrared radiation to be heated in the low-pressure surrounding, thus suppressing the lowering of food temperature caused by vaporization of water, allowing the pieces of food to be heated deep to their cores, and expediting removal of water in the low-pressure surrounding to provide semi-dried products.

The sterilization-and-water removal has the effect of extending the preservation period of dried food products. Also advantageously, the dewatering of food at a low temperature has the effect of substantially preventing the discoloring and deteriorating of dried food products, permitting long-lasting good taste.

I claim:

1. Method for far-infrared drying of food contained in an air-tight, insulating dryer using far-infrared heaters, comprising the steps of:

drawing air from the insulating dryer by a vacuum pump to reduce the inner pressure in the insulating dryer to 560 mmHg to 160 mmHg in 1 to 10 minutes;

feeding nitrogen gas containing ethanol to the insulating dryer to spray the ethanol onto the food, and raising the inner pressure to 1.0 kg/cm$^2$G to 1.9 kg/cm$^2$G in 1 to 10 minutes to keep the so raised pressure for 1 to 10 minutes;

reducing the inner pressure in the insulating dryer below 160 mmHg to 1 mmHg by the vacuum pump within 30 minutes after stopping the feeding of the nitrogen gas containing ethanol;

supplying the far-infrared heaters with electricity to heat the food while keeping the inner pressure in the insulating dryer below 160 mmHg to 1 mmHg, thereby keeping the core temperature of the food at 0° C. to 10° C. for 15 to 90 minutes; and supplying the insulating dryer with air until the inner pressure in the insulating dryer has reached atmospheric pressure.

* * * * *